Aug. 7, 1923.
W. W. DRUMMOND
ELECTRIC CONTROLLING DEVICE
Filed Jan. 23, 1920
1,464,470
5 Sheets-Sheet 1
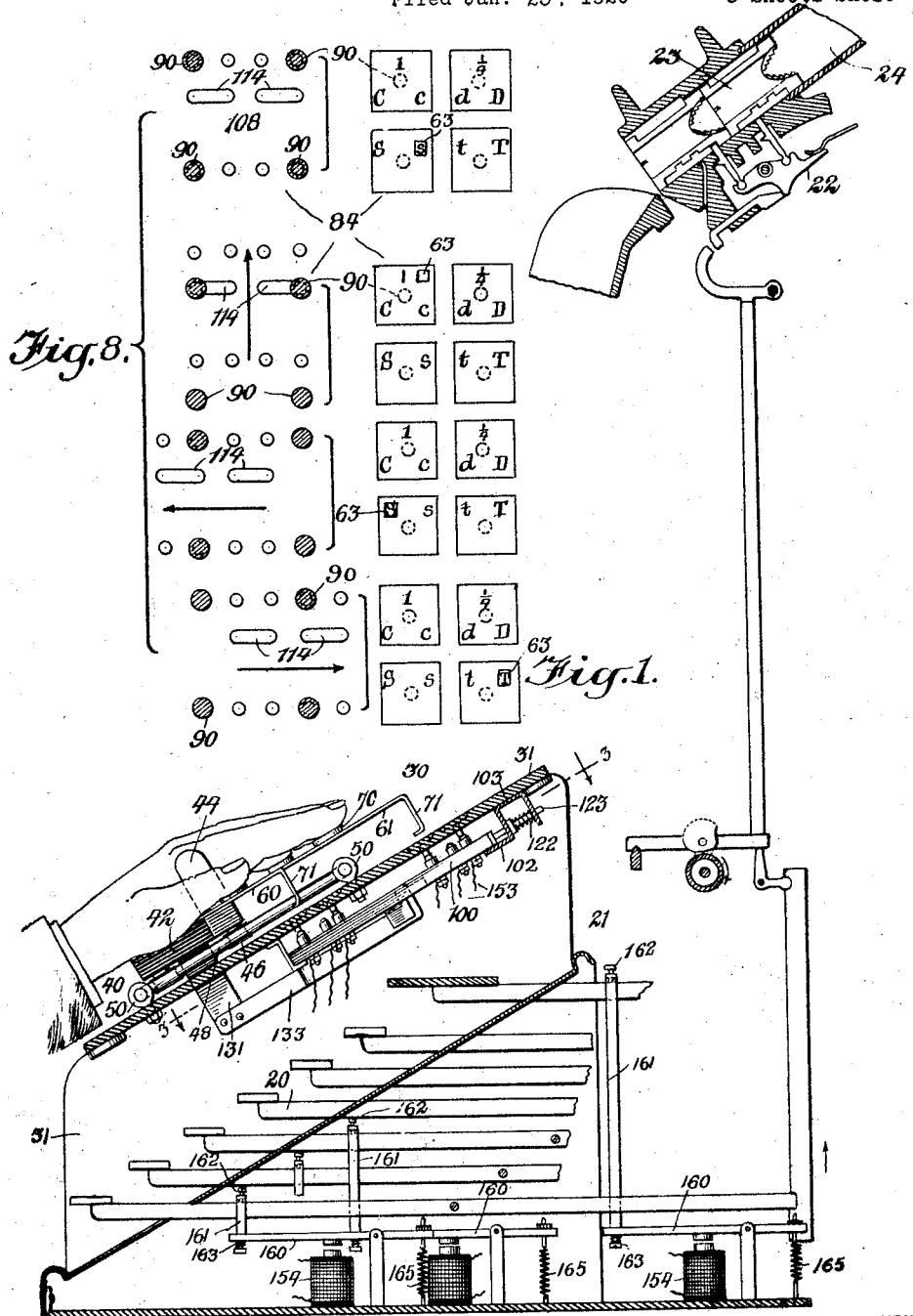

Aug. 7, 1923.
W. W. DRUMMOND
1,464,470
ELECTRIC CONTROLLING DEVICE
Filed Jan. 23, 1920    5 Sheets-Sheet 2
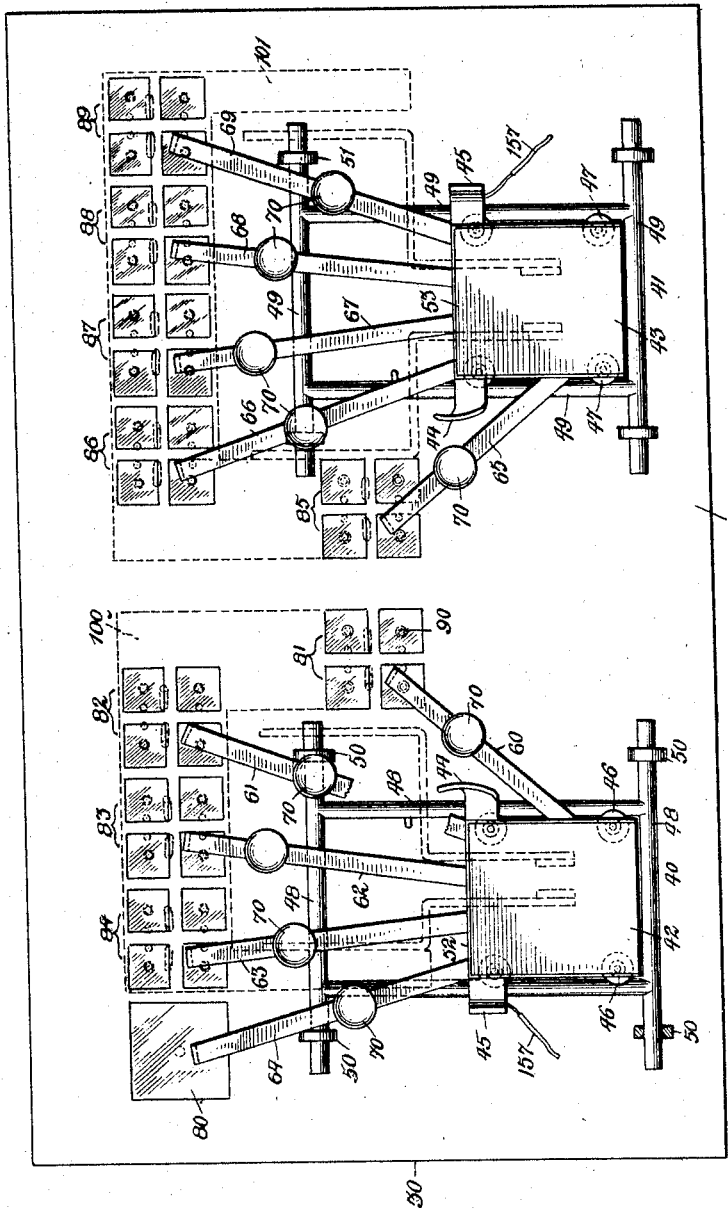
WITNESSES
INVENTOR
W. W. Drummond
BY
ATTORNEYS

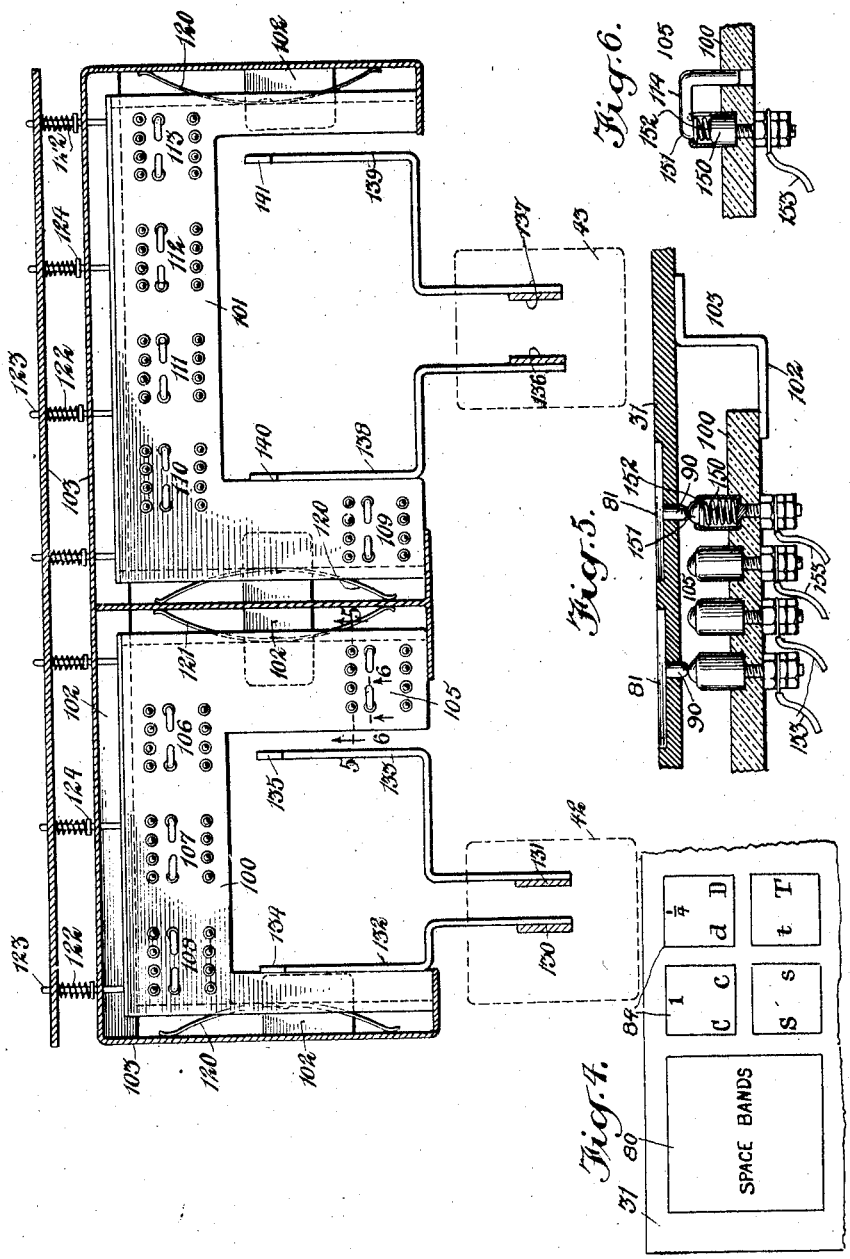

Aug. 7, 1923.
W. W. DRUMMOND
1,464,470
ELECTRIC CONTROLLING DEVICE
Filed Jan. 23, 1920
5 Sheets-Sheet 4
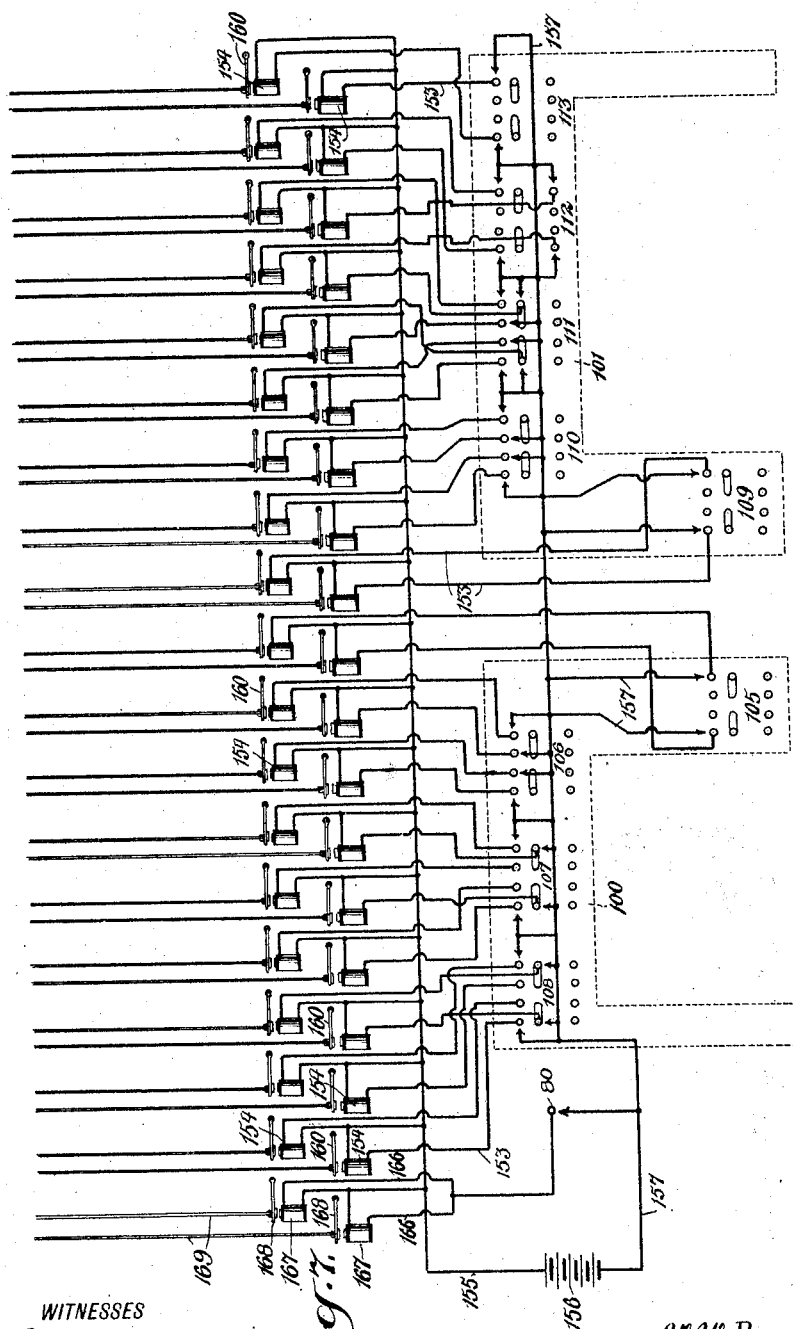
WITNESSES
INVENTOR
W. W. Drummond
BY
ATTORNEYS Aug. 7, 1923.
W. W. DRUMMOND
ELECTRIC CONTROLLING DEVICE
Filed Jan. 23, 1920
1,464,470
5 Sheets-Sheet 5
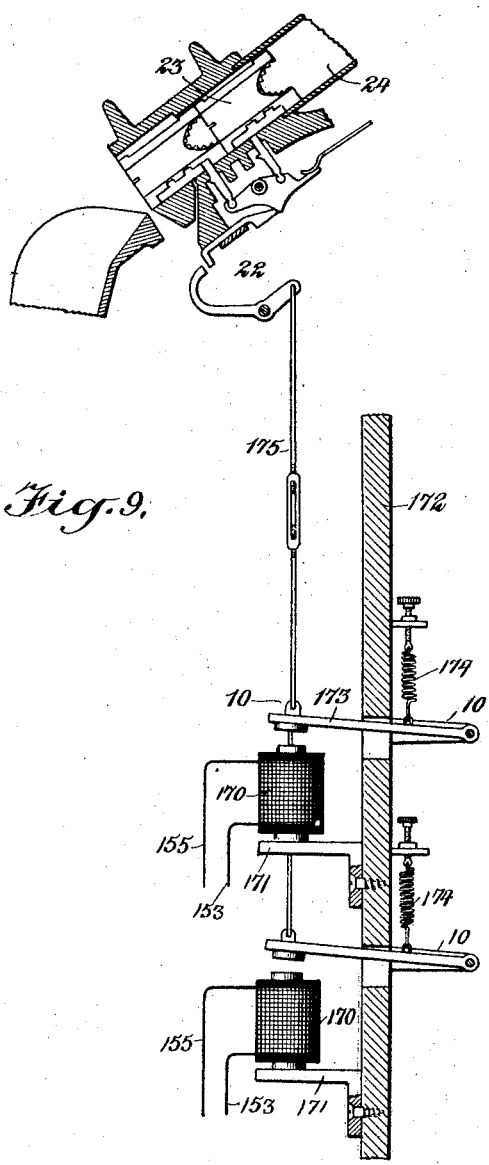
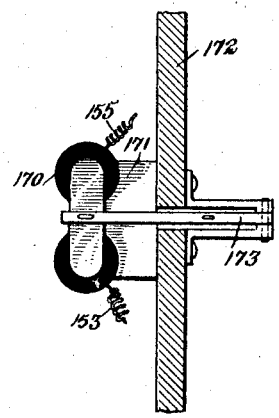
WITNESSES
INVENTOR
W. W. Drummond
BY
ATTORNEYS Patented Aug. 7, 1923.

1,464,470

UNITED STATES PATENT OFFICE.

WALTER WILLIS DRUMMOND, OF FORT COLLINS, COLORADO.

ELECTRIC CONTROLLING DEVICE.

Application filed January 23, 1920. Serial No. 353,635.

*To all whom it may concern:*

Be it known that I, WALTER W. DRUMMOND, a citizen of the United States, and a resident of Fort Collins, in the county of Larimer and State of Colorado, have invented a new and Improved Electric Controlling Device, of which the following is a full, clear, and exact description.

The object of the invention is to provide a new and improved electric controlling device for typesetting and other machines using a controlling keyboard, and arranged to permit an operator to selectively actuate the desired mechanisms of the machine without requiring much shifting on the part of the operator. Another object is to permit the use of the electric controlling device on typesetting and similar machines without the use of the usual keyboard. Another object is to permit convenient removal of the electric controlling device from the typesetting or other machine whenever it is desired to actuate the machine by the use of keys of its keyboard. Another object is to permit of controlling a typesetting or other machine by the use of the electric controlling device located remote from the machine.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a cross section of the electric controlling device in position on the usual keyboard of a typesetting machine, parts of which are shown in section;

Figure 2 is an enlarged plan view of the keyboard of the electric controlling device with a portion of one of the selective members shown broken out;

Figure 3 is an enlarged sectional plan view of the switch board, the section being on the line 3—3 of Figure 1;

Figure 4 is an enlarged plan view of a portion of the keyboard;

Figure 5 is an enlarged sectional side elevation of a portion of the switch board, the section being on the line 5—5 of Figure 3;

Figure 6 is a similar view of the same on the line 6—6 of Figure 3;

Figure 7 is a diagrammatic view of a portion of the electric controlling device;

Figure 8 is an enlarged diagrammatic plan view of the different positions of one group of contact points of the switch board relative to the fixed contact points of the corresponding group of stationary contacts;

Figure 9 is an enlarged sectional side elevation of a portion of a modified form of the electric controlling device as applied to the releasing device for releasing the matrices from the magazine of a typesetting machine; and Figure 10 is a sectional plan view of the same on the line 10—10 of Figure 9.

The electric controlling device is shown applied to a typesetting machine for actuating the keys 20 of the usual keyboard 21 and controlling the releasing mechanism 22 for releasing matrices 23 from the magazine 24 when pressing the keys 20 in the usual manner. The electric controlling device is provided with a keyboard 30 having a support or frame 31 of vulcanized rubber, glass or other insulating material and detachably mounted on the keyboard 21 to permit removal of the keyboard 30 whenever it is desired to actuate the keys 20 by hand instead of by the electric controlling device, as hereinafter more fully explained. On the top of the support 31 of the keyboard 30 are mounted two movable carriages 40 and 41, of which the carriage 40 is provided with a hand rest 42 for the left hand of an operator and the carriage 41 is provided with a similar hand rest 43 for the right hand of the operator. The hand rests 42 and 43 are provided with upwardly projecting arms 44 and 45, of which the arms 44 are adapted to pass between the thumbs and forefingers of the hands while the arm 45 is adapted to be engaged by the little fingers of the hands to permit the operator to conveniently move the carriages 40 and 41 sidewise as hereinafter more fully explained. The hand rests 42 and 43 are provided with wheels 46, 47 mounted to travel transversely on frames 48 and 49 mounted to slide sidewise in suitable bearings 50 and 51 arranged on top of the support 31. It will be noticed that by the arrangement described the operator with the hands resting on the hand rests 42 and 43 can move the latter forward or backward in a transverse direction and move the frames 48 and 49 sidewise to the right or to the left. The hand rests 42 and 43 are preferably made of vulcanized rubber, glass or other insulating material and are provided with metal bands 52 and 53 from which radiate sets of flexible selective fingers 60, 61, 62, 63, and 64 for the carriage 40, and 65, 66, 67, 68 and 69 for the carriage 41. Each finger is provided with a button 70 adapted to be engaged by the corresponding thumb or finger of the hands of the operator, and the said fingers are flexible and their terminals are normally above the face of the support 31. Each finger has its terminal provided with a depending contact point 71. The selective finger 64 controlled by the little finger of the left hand is adapted to make contact with a contact plate 80 inserted in the support 31 and of such a size and shape that the finger 64 when pressed moves into engagement with the contact plate 80 in any position the carriage 40 may be in at a time. The selective fingers 60, 61, 62, 63, 65, 66, 67, 68 and 69 are adapted to coact with groups of contact plates 81, 82, 83, 84, 85, 86, 87, 88 and 89 arranged flush in the support 31. The contact plates in each of the groups referred to are adapted to be engaged by the corresponding selective finger on correspondingly shifting the carriage 40 or 41. Thus the operator on shifting the carriage 40 or 41 and pressing the corresponding finger 60, 61, 62, 63, 65, 66, 67, 68 or 69 can make contact with any one of the contact plates of its group of contact plates. As illustrated in Figure 2 each group of contact plates 81, 82, 83, 84, 85, 86, 87, 88 and 89 is formed of four spaced contact plates arranged in a square and each is provided with a depending contact point 90 extending below the under side of the support 31, as plainly shown in Figures 1 and 5. Sundry of the contact plates in a group represent two characters while others in the same group represent three characters such as a small and capital letter of the alphabet and a numeral, or a punctuation mark, dollar sign or the like, as will be readily understood by reference to Figure 4.

Underneath the support 31 is mounted to slide forward, backward and sidewise two switch boards 100 and 101, of which the switchboard 100 is opposite the groups of contact plates 81, 82, 83, and 84, and the switchboard 101 is opposite the groups of contact plates 85, 86, 87, 88 and 89. The switchboards 100 and 101 are mounted to slide on suitable supports 102 formed on a frame 103 attached to the under side of the support 31. The switchboard 100 is provided with groups of contact points 105, 106, 107 and 108 arranged opposite and in coacting relation with the contact plates 81, 82, 83 and 84, respectively. The other switchboard 101 is provided with groups of contact points 109, 110, 111, 112 and 113 arranged opposite and in coactive relation with the groups of contact plates 85, 86, 87, 88 and 89. As illustrated in Figure 3, each group of contact points 105 to 113 consists of an upper longitudinal row of four contact points, a lower row of four contact points and two intermediate contact points having extensions 114 ranging towards each other and in alinement with the corresponding two contact points in the row above. Each of the groups of contact points 105 to 113 has its contact points arranged in four sets corresponding to the number of contact plates in a group of contact plates 81 to 89, and each set of contact points has, at least, two in number and each contact point in a set is adapted to be moved individually into engagement with the corresponding contact plate of the group of contact plates 81 to 89.

The switchboards 100 and 101 are held in normal position relative to the corresponding groups of contact plates on the support 31 by the use of springs 120 and 121 engaging the sides of the switchboards and by springs 122 mounted on rods 123 attached to the switchboards 100 and 101 and slidable transversely and sidewise on the frame 103. Each of the springs 122 abuts at its outer end against the frame 103 and rests at its inner end on a collar 124 attached to the corresponding rod 123. When the switchboards 100 and 101 are in normal position then the corner contact pins of each group of contact pins 105 to 113 are in engagement with the four contact pins 90 of the four contact plates of the corresponding group of contact plates 81 to 89 (see dotted line positions in Figure 2 and upper portion of Figure 8). The switchboards 100 and 101 are approximately U-shaped, as shown in Figure 3, and are adapted to be shifted forwardly and sidewise from the corresponding hand rests 42 and 43 of the carriages 40 and 41. For the purpose mentioned the hand rest 42 is provided with depending brackets 130 and 131 to which are attached arms 132, 133 provided at their ends with upwardly extending lugs 134 and 135 adapted to engage the inner edges of the switchboard 100 on correspondingly moving the hand rest 42. The other hand rest 43 is provided with depending brackets 136 and 137 provided with arms 138, 139 terminating at their ends in upwardly extending lugs 140 and 141 adapted to engage the inner edges of the switchboard 101 to shift the latter on moving the hand rest 43. When the carriages 40 and 41 are in the position shown in Figure 2 and the switchboards 100 and 101 are normally in the position shown in Figure 3 then the lugs 135 and 141 of the arms 133 and 139 are out of engagement with the adjacent edges of the switchboards 100 and 101 while the lugs 134 and 140 of the arms 132 and 138 are in engagement with the left-hand inner edges of the switchboards 100 and 101. On moving the carriage 40 or 41 any one of the selective fingers 60, 61, 62, 63, 65, 66, 67, 68 and 69 can be moved in register with the desired contact plate of its group as above mentioned, and by correspondingly shifting at times the switchboard 100 or 101 with such carriage any desired one of the contact points of the several groups of contact points 105 to 113 can be moved into registry with the contact 90 of the corresponding selected contact plate of the corresponding group of contact plates 81 to 89. Thus by the arrangement described ninety different contacts can be made to which must be added the contact adapted to be made at all times by the finger 64 engaging the contact plate 80. It is understood that I do not limit myself, however, to the particular number of contact plates and contact points in the groups of contact plates and points shown and described as the same may be varied according to the work to be performed by the electric controlling device on a particular machine.

Each contact point on the switchboards 100 and 101 is constructed as follows: A tubular binding post 150 is attached to the switchboard and contains a point 151 pressed on by a spring 152 to insure proper engagement of the point 151 with the corresponding point 90 of a contact plate 81, as will be readily understood by reference to Figure 5. Each binding post 150 is connected by a circuit wire 153 with an electromagnet 154, and the several electromagnets are mounted on the bottom of the keyboard 21 and are connected with a line wire 155 connected with a battery or other suitable source of electrical energy 156. A line wire 157 connects the source of electrical energy 156 with bands 52, 53 of the frames 42, 43 which carry the fingers 60, 61, 62, 63, 65, 66, 67, 68 and 69. When one of the fingers is pressed and contact is made with the corresponding contact plate in the support 31 the circuit for the corresponding electromagnet 154 is closed as a corresponding contact point of the switchboard is in engagement with the corresponding contact plate. The particular electromagnet is thus energized and attracts its armature lever 160 connected by a stirrup 161 with the corresponding key 20 of the usual keyboard 21. Thus when an electromagnet 154 is energized the corresponding key 20 is pressed and the desired matrix 23 is released by the releasing device 22 in the magazine 24. Each stirrup 161 is provided at the top with a set screw 162 engaging the top of the corresponding key 20 to permit minute adjustment of the stirrup and its armature lever 160 relative to the electromagnet 154. The lower end of each stirrup is pressed on by a spring 163 to provide a yielding connection between an armature lever 160 and the corresponding key 20. Each armature lever 160 is pressed on by a spring 165 to normally hold the stirrup 161 in uppermost position and to allow actuating of the keys 20 by hand whenever it is desired to do so and the electrical keyboard 30 is removed from the ordinary keyboard 21. The contact plate 80 is connected by wires 166 with two electromagnets 167 (see Figure 7) having their armature levers 168 connected by links 169 with the ends of a space band lever, and hence when the finger 64 is pressed in contact with the contact plate 80 then the circuits for the electromagnets 167 are closed and the electromagnets are energized to pull down the space band lever.

When the ordinary keyboard 21 is dispensed with then the electromagnets 170 connected with the switchboard contact points are mounted on brackets 171 attached to a vertical support 172. The armature 173 of each electromagnet 170 is pressed on by a spring 174 and is connected by an adjustable link 175 with the releasing mechanism 22 for releasing a matrix 23 from the magazine 24.

The operation is as follows:

In using the electric controlling device the operator places the palm of the left hand on the hand rest 42 and the palm of the right hand onto the hand rest 43 and engages with the tips of the thumbs and fingers the buttons 70 of the fingers 60 to 69. With the hands in this position the operator can readily shift the hand rests 42 and 43 transversely and move the same bodily sidewise with the frames 48, 49 to shift the carriages 40 and 41 to the desired positions with a view to move the fingers in registry with the contact plate 80.

When the operator with the little finger of the left hand presses the finger 64 into engagement with the contact plate 80 then the circuits of the electromagnets 167 are closed and the space band lever is pulled down for the release of a space band. The operator immediately releases the finger 64 after pressing it to break the circuit for the electromagnets 167 and thus allows the armature levers 168 and the space band lever to return to normal inactive position. It is understood that the operation of this finger 64 with its contact plate 80 is wholly independent of the switchboards 100 and 101.

With the switchboards 100 and 101 in normal positions relative to the groups of contact plates 81 to 89, as previously described and shown in Figures 2 and 3, it is not necessary to shift the switchboards 100 and 101 when making four selective operations for each group of contact plates 81 to 89. The four corner contact points of the group of contact points 108, for instance, are in contact with the four contact plates of the group of contact plates 84 and represent the four small letters of the alphabet c, d, s and t (see Figure 4), and hence for releasing the corresponding matrices it is only necessary for the operator to move and to press the finger 63 successively into engagement with the corresponding four contact plates of the group of contact plates 84. Thus when the operator presses the finger into engagement with the lower left hand corner plate of the group of contact plates 84 (see Figure 2) then the circuit is closed for the electromagnet 154 connected with the releasing device 22 for the matrix 23 carrying the small letter s (see Figure 4 and the upper portion of Figure 8). When the operator shifts the hand rest 42 forward, the finger 63 moves over the upper left hand contact plate of the group of contact plates 84 and on now pressing this finger 63 the circuit is closed for the corresponding electromagnet 154 controlling the releasing mechanism 22 for the matrix 23 carrying the small letter c. When the operator shifts the hand rest 42 and the carriage 40 from the last position to the right, the finger 63 moves into register with the right upper contact plate of the group of contact plates 84, and on pressing this finger the circuit is closed for the corresponding electromagnet 154 controlling the releasing mechanism 22 for the matrix carrying the letter d. When the hand rest 42 is now moved toward the operator or rearwardly then the finger 63 moves into register with the lower right hand contact plate of the group of contact plates 84, and on pressing this finger the corresponding electromagnet 154 actuates the releasing mechanism for the matrix for the letter t. The above described operation is repeated relative to the other fingers (except finger 64), their fixed groups of contact plates and the corresponding groups of contact pins on the switchboards 100 and 101. It will be noticed that by the arrangement described it is only necessary to shift the carriages 40 and 41 with a view to move the fingers 60, 61, 62, 63, 65, 66, 67, 68 and 69 into register and contact with the desired contact plates of the groups of contact plates 81 to 89 and without shifting either switchboard 100 or 101. It will be noticed that by the arrangement of the arms 132, 133, 138 and 139 relative to the switchboards 100 and 101 the latter are not shifted on shifting the carriages 40 and 41, as above described.

When it is desired to release the matrices, say for the capital letters of the alphabet, it is necessary to give additional movement to the carriages 40 and 41 and hence to the switchboards 100 and 101 by the action of the lugs 134, 135, 140 and 141 of the arms 132, 133, 138 and 139 with a view of moving the other contact points of the upper and lower rows of each group of contact points 105 to 113 into engagement with the corresponding contact plates of the corresponding groups of contact plates 81 to 89. The fingers are then manipulated as above explained for releasing the matrices bearing the corresponding capital letters. When it is desired to release the matrices, say for numerals and other characters, then the switchboards 100 and 101 are shifted by correspondingly manipulating the carriages 40 and 41 to move the corresponding intermediate contact points having the extensions 114 of the groups of contact points 105 to 113 into engagement with the corresponding contact plates of the corresponding groups of contact plates 81 to 89. It will be noticed that the extensions 114 facilitate the contact-making of the carriages from either of two contact points of the upper or lower rows in alinement with the extensions without requiring sidewise shifting of the switchboards.

From the foregoing it will be seen that the operator is enabled to selectively actuate the desired mechanisms of the machine without requiring shifting of the hands and without requiring undue physical exertion on the part of the operator.

Having thus described my invention, I claim as new and desire to secure by Letters Patent:—

1. In an electric controlling device, a manually controlled selective member, a group of fixed contact elements any one of which is adapted to be engaged by the said selective member, and a movable switchboard having a group of contact points arranged in sets one for each contact element, each set of contact points having at least two contact points adapted to be moved individually into engagement with the corresponding element.

2. In an electric controlling device, a group of fixed contact elements, a manually controlled selective member adapted to engage any one of the said contact elements at one face thereof, and a movable keyboard having a group of contact points arranged in sets, one for each contact element, each set containing at least two contact points adapted to move individually in contact with the other face of the corresponding contact element.

3. In an electric controlling device, a manually controlled selective member, a group of fixed contact elements, any one of which is adapted to be engaged by the said selective members, a movable switchboard having a group of contact points arranged in sets, one for each contact element, each set of contact points having at least two contact points adapted to be moved individually into engagement with the corresponding element, and means moving with the said selective member and controlling the movement of the said switchboard.

4. An electric controlling device, comprising groups of fixed contact elements, manually controlled selective devices, one for each group of contact elements, each adapted to be moved into engagement with each contact element of the corresponding group of contact elements, and a movable switchboard provided with groups of individual contact members, one group for each group of fixed contact elements, each group of contact members being arranged in sets of contact members adapted to be moved individually into engagement with a corresponding fixed contact element of the corresponding group of fixed contact elements.

5. An electric controlling device, comprising groups of fixed contact elements, a movable hand carriage provided with selective members controlled by the operator, each selective member being adapted to move in registry with each contact element of a group of contact elements, and a movable switchboard provided with groups of contact members sundry of which are adapted to be moved into engagement with a corresponding contact element of a corresponding group of fixed contact elements.

6. An electric controlling device, comprising fixed contact plates arranged in groups and each provided with a contact point, selective fingers under the control of an operator and each adapted to register with each contact plate of a group of contact plates, a hand carriage carrying the said selective fingers and mounted to move forward, backward and sidewise to permit of moving each contact finger into register with each one of the contact plates of a group, and a switchboard provided with groups of contact points, sundry of which are adapted to be moved into engagement with the contact point of a corresponding fixed contact plate, the said switchboard being adapted to be shifted forward, backward or sidewise and being controlled by the said hand carriage.

7. An electric controlling device provided with a keyboard, comprising groups of fixed and spaced contact plates, manually controlled movable selective fingers arranged over the said groups of fixed contact plates, one for each group of fixed contact plates, each selective finger being adapted to be moved into engagement with any one of the contact plates of the corresponding group, and a switchboard movable on the other side of the fixed contact plates and provided with groups of contact points arranged in sets, the individual contact points of each set being adapted to be moved into contact with a corresponding fixed contact plate.

8. An electric controlling device, comprising a fixed support, groups of spaced contact plates fixed on the said support, carriages mounted to move forward, backward and sidewise on the said support and provided with flexible selective fingers, one for engagement with each of the plates of a group of contact plates, and switchboards mounted to slide forward, backward and sidewise on the under side of the said support and controlled by the said carriages, the said switchboards being provided with groups of contact points, one group for a corresponding group of contact plates, sundry of the contact points of a group being adapted to be moved individually into engagement with the corresponding contact plate.

9. An electric controlling device, comprising groups of fixed contact elements, manually controlled selective devices one for each group of contact elements, each adapted to be moved into engagement with each contact element of the corresponding group of contact elements, a movable switchboard provided with groups of individual contact members, one group for each group of fixed contact elements, each group of contact members being arranged in sets of contact members adapted to be moved individually into engagement with a corresponding fixed contact element of the corresponding group of fixed contact elements, a single fixed contact element, a single selective device for the said single contact element and an electrical connection between the contact element and the selective element.

10. An electric controlling device, comprising a fixed support, groups of spaced contact plates fixed on the said support, carriages mounted to move forward, backward and sidewise on the said support and provided with flexible selective fingers, one for engagement with each of the plates of a group of contact plates, switchboards mounted to slide forward, backward and sidewise on the under side of the said support and controlled by the said carriages, the said switchboards being provided with groups of contact points, one group for a corresponding group of contact plates, sundry of the contact points of a group being adapted to be moved individually into engagement with the corresponding contact plate, electrically actuating devices electrically connected with the said switchboard contact points and the said selective fingers, the said devices being adapted to actuate the parts of a machine on which the controlling device is used, a single contact plate adjacent one of the said groups of spaced contact plates, and a separate selective finger on one of the said carriages and adapted to engage the said single contact plate in any position the carriage may be in.

11. An electric controlling device provided with a fixed contact plate, and a carriage movable forward, backward and sidewise and provided with a manually controlled contact member mounted on the carriage and adapted to engage the said fixed contact plate in any position the carriage may be in.

12. An electric controlling device, comprising a fixed support, groups of spaced contact plates fixed on the said support, carriages mounted to move forward, backward and sidewise on the said support and provided with flexible selective fingers, one for engagement with each of the plates of a group of contact plates, switchboards mounted to slide forward, backward and sidewise on the under side of the said support and controlled by the said carriages, the said switchboards being provided with groups of contact points, one group for a corresponding group of contact plates, sundry of the contact points of a group being adapted to be moved individually into engagement with the corresponding contact plate, springs pressing the said switchboards to hold the same in normal position, and operating means carried by the said carriages and adapted to engage the said switchboards to shift the latter forward or sidewise on correspondingly actuating the carriages.

13. In an electric controlling device, a group of fixed contact plates and a switchboard movable relative to the said fixed contact plate, the said switchboard being provided with a group of spaced contact points of which at least one is provided with a sidewise extension, the contact point with an extension being in alinement with at least two of the other contact points of the group, sundry of the said contact points being adapted to move individually in engagement with a corresponding plate of the group of contact plates.

14. In an electric controlling device, a group of fixed contact plates and a switchboard movable relative to the said fixed contact plate, the said switchboard being provided with a group of spaced contact points of which at least one is provided with a sidewise extension, the contact point with an extension being in alinement with at least two of the other contact points of the group, sundry of the said contact points being adapted to move individually in engagement with a corresponding plate of the group of contact plates, and a selective member adapted to be moved into engagement with any one of the said contact plates.

15. In an electric controlling device, a movable selective member, a group of fixed contact plates each adapted to be engaged by the said selective member, and a movable switchboard provided with a group of spaced contact points, sundry of which are adapted to move individually into engagement with a corresponding fixed contact plate of the group of contact plates.

16. In an electric controlling device, a movable selective member, a group of fixed contact plates each adapted to be engaged by the said selective member, a movable switchboard provided with a group of spaced contact points, sundry of which are adapted to move individually into engagement with a corresponding fixed contact plate of the group of contact plates, and means moving with the said selective member and adapted to engage and move the said switchboard.

17. In an electric controlling device, a movable selective member, a group of fixed contact plates each adapted to be engaged by the said selective member, a movable switchboard provided with a group of spaced contact points, sundry of which are adapted to move individually into engagement with a corresponding fixed contact plate of the group of contact plates, springs pressing the said switchboard to hold the same in normal position, and means moving with the said movable selective member and adapted to shift the said switchboard.

WALTER WILLIS DRUMMOND.